US008034427B2

(12) United States Patent
Unno et al.

(10) Patent No.: US 8,034,427 B2
(45) Date of Patent: Oct. 11, 2011

(54) FRICTION MATERIAL COMPOSITION AND FRICTION MATERIAL PRODUCED THEREWITH

(75) Inventors: Mitsuo Unno, Hitachi (JP); Kazuya Baba, Hitachi (JP)

(73) Assignee: Hitachi Chemical Co., Ltd., Tokyo (JP)

( * ) Notice: Subject to any disclaimer, the term of this patent is extended or adjusted under 35 U.S.C. 154(b) by 0 days.

(21) Appl. No.: 12/665,042

(22) PCT Filed: Jun. 20, 2008

(86) PCT No.: PCT/JP2008/061303
§ 371 (c)(1),
(2), (4) Date: Dec. 17, 2009

(87) PCT Pub. No.: WO2008/156161
PCT Pub. Date: Dec. 24, 2008

(65) Prior Publication Data
US 2010/0196691 A1    Aug. 5, 2010

(30) Foreign Application Priority Data

Jun. 20, 2007  (JP) ................................. 2007-162428
Dec. 13, 2007  (JP) ................................. 2007-322045

(51) Int. Cl.
*B32B 3/02* (2006.01)
(52) U.S. Cl. ......................................... 428/66.2; 106/36
(58) Field of Classification Search ................ 188/18 A; 428/66.1, 66.2, 301.4; 442/189; 106/38.22, 106/36; 192/107 M
See application file for complete search history.

(56) References Cited

U.S. PATENT DOCUMENTS

2010/0233464 A1 * 9/2010 Unno ............................ 428/323

FOREIGN PATENT DOCUMENTS

| JP | 06-305760 | 11/1994 |
| JP | 07-102080 | 4/1995 |
| JP | 2879364 | 1/1999 |
| JP | 2003301878 | * 10/2003 |
| WO | WO 2007/080975 A1 | 7/2007 |

OTHER PUBLICATIONS

English translation of International Preliminary Report on Patentability of International Appln. No. PCT/JP2008/061303 dated Jan. 21, 2010.

* cited by examiner

*Primary Examiner* — Arti Singh-Pandey
(74) *Attorney, Agent, or Firm* — Antonelli, Terry, Stout & Kraus, LLP.

(57) ABSTRACT

Disclosed is a friction material composition, comprising a fiber matrix, a binder, an organic filler, and an inorganic filler, wherein the fiber matrix contains at least two types of mineral fibers different in average fiber length from each other, and the difference between the minimum value and the maximum value among the average fiber lengths of the mineral fibers is 50 μm or more. Also disclosed is a friction material produced by pressure-molding the friction material composition while heating. Further disclosed is a friction material having an underlayer material interposed between a friction surface and a back metal, while the underlayer material is produced by pressure-molding the friction material composition while heating.

8 Claims, 1 Drawing Sheet ered by molding a composition containing a fiber matrix, a binder, a filler, and the like. In particular, the fiber matrix forms the skeleton of friction materials to impart properties for the shear strength of friction materials.
FRICTION MATERIAL COMPOSITION AND FRICTION MATERIAL PRODUCED THEREWITH

TECHNICAL FIELD

The present invention relates to a friction material composition suitable for friction materials such as disc brake pads and brake linings for use in braking vehicles and the like. The invention also relates to a friction material produced with the friction material composition.

BACKGROUND ART

For vehicles and the like, friction materials such as disc brake pads and brake linings for braking are used.

Such friction materials produce friction with counterpart materials such as a disc rotor and a brake drum to play a role in braking. Therefore, they are required to have not only high friction coefficient and friction coefficient stability but also sufficient strength.

Such friction materials are produced by molding a composition containing a fiber matrix, a binder, a filler, and the like. In particular, the fiber matrix forms the skeleton of friction materials to impart properties for the shear strength of friction materials.

Conventionally, asbestos materials (asbestos) have been used as the fiber matrix for friction materials. Since asbestos was recognized as a material having a harmful effect on human body, alternatives to it have been produced under legal control or the like in each country.

There is proposed a friction material containing different fibers such as inorganic fibers, metal fibers and organic fibers as a fiber matrix alternative to the asbestos material (see for example Patent Document 1). In particular, mineral fibers as an alternative thereto are known to be highly effective in increasing the strength of friction materials.

Mineral fibers are generally produced by melt spinning method. Among mineral fibers produced by melt spinning method, long mineral fibers have poor dispersibility, and the unloosed fibers do not contribute to an improvement in the strength of friction materials. On the other hand, highly dispersible short fibers tend to have a low reinforcing effect. In addition, when the blending amount of mineral fibers is increased, not only the dispersibility may be degraded, but also disadvantages such as an increase in aggressiveness to the opposite material may tend to occur.

DISCLOSURE OF THE INVENTION

In view of the above circumstances, the present invention has been made. Therefore, an object of the invention is to provide a friction material composition in which mineral fibers provides an improved reinforcing effect as compared with conventional compositions so that the friction material composition has high shear strength to the object, and to provide a friction material produced with such a friction material composition.

Another object of the invention is to provide a friction material composition in which mineral fibers provides an improved reinforcing effect as compared with conventional compositions, although the blending amount of the mineral fibers in the composition is the same as that in the conventional compositions, so that the friction material composition has high shear strength to the object, and to provide a friction material produced with such a friction material composition.

In order to achieve the objects, the inventors have made investigations on the length of mineral fibers and the dispersibility and the reinforcing effect of the fibers. As a result, the inventors have found that when at least two types of mineral fibers different in average fiber length from each other are used in combination, the dispersibility of the mineral fibers is improved, and the shear strength to the object is also improved as compared with the case where a single type of mineral fibers are used, because the mineral fibers dispersed in the friction material composition have a wide fiber length distribution. Specifically, the invention has been completed based on the finding that when the difference between the minimum value and the maximum value among average fiber lengths of the mineral fibers is 50 µm or more in the combination of the mineral fibers different in average fiber length, the mineral fibers have improved dispersibility, so that the effect of increasing the shear strength is produced.

Thus, the present invention provides the following.

(1) A friction material composition, including a fiber matrix, a binder, an organic filler, and an inorganic filler, wherein the fiber matrix includes at least two types of mineral fibers different in average fiber length, and the difference between the minimum value and the maximum value among average fiber lengths of the mineral fibers is 50 µm or more.

(2) The friction material composition according to item (1), wherein the mineral fibers contain an Al element.

(3) The friction material composition according to item (1) or (2), wherein the mineral fibers have a total average fiber length of 500 µm or less.

(4) The friction material composition according to any one of items (1) to (3), wherein the mineral fibers are bio-soluble mineral fibers.

(5) The friction material composition according to any one of items (1) to (4), containing 5 to 25% by mass of the mineral fibers, based on the amount of the whole of the friction material.

(6) The friction material composition according to any one of items (1) to (5), wherein the fiber matrix contains at least 5% by mass of nonferrous metal fibers and/or at least 1% by mass of fibrillated organic fibers other than the mineral fibers.

(7) A friction material produced by molding the friction material composition according to any one of items (1) to (6).

(8) A friction material, including a back metal, a friction member having a friction surface, and an underlayer material interposed between the back metal and the friction member and produced by molding the friction material composition according to any one of items (1) to (6).

BEST MODE FOR CARRYING OUT THE INVENTION

Figure 1:
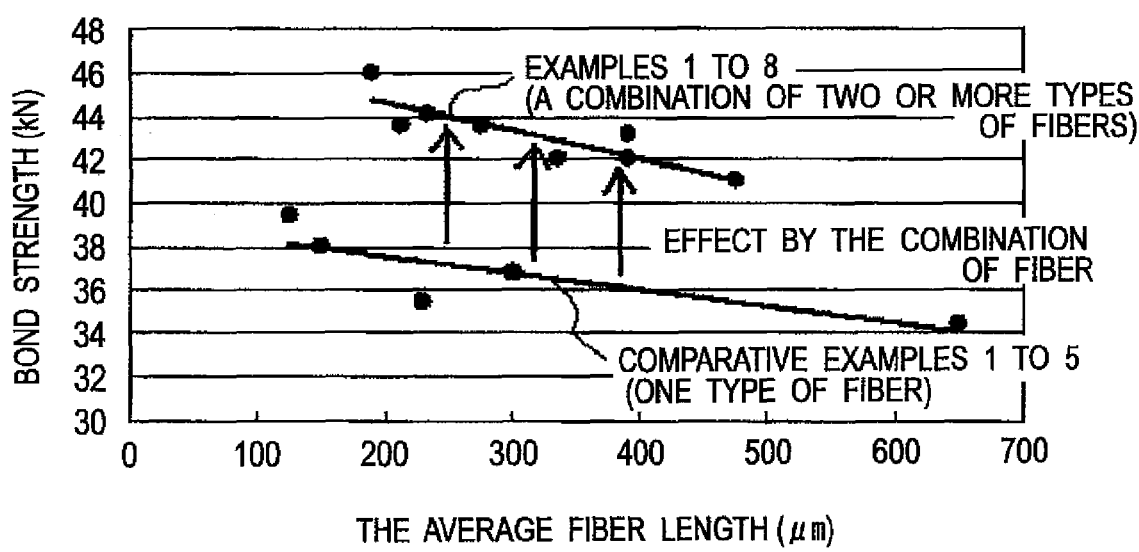
FIG. 1 is a graph showing the relationship between shear strength and average fiber length.

The friction material composition according to the invention and the friction material produced therewith are described in detail below.

Inorganic fibers, organic fibers, metal fibers, or the like may be used as the fiber matrix of the friction material composition. In the invention, the friction material composition contains, as the inorganic fibers, at least two types of mineral fibers different in average fiber length from each other, wherein the difference between the minimum value and the maximum value among average fiber lengths of the mineral fibers is 50 µm or more. If the difference is less than 50 µm, the improvement of the shear strength tends to be failed. The difference is more preferably from 50 to 600 µm.

As used herein, the term "mineral fibers" is intended to include blast furnace slag such as slag wool, basalt such as basalt fibers, or other artificial inorganic fibers produced by melting and spinning a material mainly composed of natural rock or the like into fibers. The mineral fibers are more preferably natural mineral fibers containing an Al element. Specifically, the mineral fibers to be used may contain $SiO_2$, $Al_2O_3$, CaO, MgO, FeO, $Na_2O$, or the like, or contain one or more of these compounds. Among these mineral fibers, Al element-containing mineral fibers are more preferably used.

As used herein, the term "at least two types of mineral fibers different in average fiber length from each other" refers to mineral fibers having at least two peaks in the fiber length distribution, wherein one type of fibers have one peak in the fiber length distribution. In the invention, the mineral fibers have a difference of 50 µm or more between the minimum value and the maximum value of the peaks.

For example, adjusting the difference between the minimum value and the maximum value among the average fiber lengths to be 50 µm or more may be performed by a method of mixing two types of mineral fibers whose average fiber lengths differ by 50 µm or more. As long as the difference between the minimum value and the maximum value among the average fiber lengths is 50 µm or more, two or more types of mineral fibers whose average fiber lengths are between them may be mixed.

The shear strength tends to decrease with increasing the average fiber length of all the mineral fibers in the friction material composition. Therefore, the average fiber length of all the mineral fibers is preferably 500 µm or less, more preferably from 100 to 400 µm.

For example, adjusting the average fiber length of all the mineral fibers to be 500 µm or less may be performed by a method of appropriately controlling the blending amounts of long fibers with a large average fiber length and short fibers with a small average fiber length.

As used herein, the term "average fiber length" refers to the number average of the lengths indicated by the average length value of all the corresponding fibers. For example, an average fiber length of 200 µm means that the average of the lengths of randomly selected 50 mineral fibers used as a raw material for the friction material composition is 200 µm, wherein the fiber lengths are measured with an optical microscope.

In view of harmfulness to human body, the mineral fibers for use in the invention are preferably bio-soluble. Such bio-soluble mineral fibers are characterized in that even when they are taken into human body, they are partially degraded and eliminated from the body in a short period of time. Specifically, such bio-soluble mineral fibers refer to fibers that have a chemical composition with a total content of alkali oxides and/or alkaline earth oxides (total content of oxides of sodium, potassium, calcium, magnesium, and barium) of 18% by mass or more and satisfy the requirement that in a short-term biopersistence test by inhalation the fibers 20 µm or more have a mass half life of 40 days or less; in an intraperitoneal test there is no evidence of excess carcinogenicity; or in a long-term inhalation test there is no relevant pathogenicity genesis or neoplastic genesis (Nota Q of EU Directive 97/69/EC (exclusion of application of carcinogenicity)).

More specifically, examples of such bio-soluble mineral fibers include $SiO_2$—$Al_2O_3$—CaO—MgO—FeO—$Na_2O$ fibers and fibers containing any combination of $SiO_2$, $Al_2O_3$, CaO, MgO, FeO, and $Na_2O$. Specifically, Roxul (registered trademark, manufactured by Lapinus Fibres) may be used, which contains $SiO_2$, $Al_2O_3$, CaO, MgO, FeO, $Na_2O$, and the like.

In a more preferred aspect of the invention, the total content of the mineral fibers in the friction material composition is from 5 to 25% by mass, based on the amount of the whole of the friction material composition, in view of dispersibility and reinforcing effect. If the total content of the mineral fibers is less than 5% by mass, they may tend to fail to produce a sufficient reinforcing effect. If the total content of the mineral fibers is more than 25% by mass, not only the dispersibility may be extremely degraded, but also the opposite material aggressiveness may tend to be increased, or the wear resistance may tend to be degraded. The total content of the mineral fibers is more preferably from 10 to 20% by mass.

In a preferred aspect of the invention, the friction material composition may contain 5% by mass or more of nonferrous metal fibers and/or 1% by mass or more of fibrillated organic fibers as an organic fiber so that the reinforcing effect can be further increased by the combination of the mineral fibers. The friction material composition more preferably contains 5 to 15% by mass of nonferrous metal fibers and/or 1 to 10% by mass of fibrillated fibers. If the content of nonferrous metal fibers is less than 5% by mass, the crack resistance may tend to be degraded. If the content of fibrillated organic fibers is less than 1% by mass, the handleability or the crack resistance during a molding process may tend to be degraded.

Examples of nonferrous metal fibers include copper fibers, brass fibers, bronze fibers, and aluminum fibers. Nonferrous metal fibers preferably have lengths of 1 to 10 µm.

Examples of fibrillated organic fibers include aramid fibers and acrylic fibers. More specifically, fibrillated organic fibers include Twaron (registered trademark) manufactured by TEIJIN LIMITED and Kevlar (registered trademark) manufactured by DU PONT-TORAY CO., LTD.

Besides the above mineral fibers, the friction material composition of the invention may also contain other inorganic fibers such as bio-soluble ceramic fibers, potassium titanate fibers, glass fibers, wollastonite fibers, or steel fibers. In order to reduce environmental loading materials, however, such inorganic fibers are preferably bio-soluble and free of potassium titanate fibers or glass fibers, which have a risk of aspiration into the lungs, are preferable.

Organic fibers other than the fibrillated organic fibers, such as cellulose fibers, carbon fibers, phenolic resin fibers, or polyimide fibers may also be used as the fiber matrix.

The content of the fiber matrix (including the inorganic fibers, the organic fibers and the like) in the friction material composition of the invention is preferably from 5 to 50% by mass, more preferably from 10 to 30% by mass.

The binder in the friction material composition of the invention may be a thermosetting resin conventionally used in friction material compositions. Examples of such a thermosetting resin include phenolic resins, acrylic-modified phenolic resins, silicone-modified phenolic resins, cashew-modified phenolic resins, epoxy-modified phenolic resins, alkylbenzene-modified phenolic resins, and amino resin-modified phenolic resins. Phenolic resins, acrylic-modified phenolic resins, silicone-modified phenolic resins, or the like are particularly preferred. These resins may be used singly or in combination of two or more thereof.

The content of the binder in the friction material composition of the invention is preferably from 5 to 20% by mass, more preferably from 5 to 15% by mass. If it is less than 5% by mass, the strength of the friction material may tend to be degraded. If it is more than 20% by mass, the friction material may tend to have a reduced porosity and an increased elastic modulus, so that it may tend to have degraded sound vibration performance, such as brake squeal noise.

Examples of the organic filler contained in the friction material composition of the invention include a cashew dust, a tire rubber powder, an acrylic rubber powder, an isoprene rubber, NBR, SBR, and the like. These may be used singly or in combination of two or more thereof.

The content of the organic filler in the friction material composition is preferably from 2 to 30% by mass, more preferably from 5 to 15% by mass. If it is less than 2% by mass, the friction material may tend to have an increased elastic modulus, so that it may tend to have degraded sound vibration performance, such as brake squeal noise. If it is more than 30% by mass, the heat resistance may tend to be degraded so that the strength may tend to be reduced by thermal history.

Examples of the inorganic filler contained in the friction material composition of the invention include antimony trisulfide, tin sulfide, molybdenum disulfide, iron sulfide, bismuth sulfide, zinc sulfide, boron nitride, magnesium oxide, calcium hydroxide, calcium oxide, sodium carbonate, calcium carbonate, magnesium carbonate, barium sulfate, coke, graphite, mica, iron oxide, vermiculite, particulate calcium titanate, calcium sulfate, zirconium oxide, zircon sand, alumina, plate-like calcium titanate, diatom earth, talc, clay, mullite, and zeolite. These may be used singly or in combination of two or more thereof.

The content of the inorganic filler in the friction material composition is preferably from 20 to 80% by mass, more preferably from 30 to 60% by mass. If it is less than 20% by mass, the heat resistance may tend to be degraded. If it is more than 80% by mass, the balance between the contents of the inorganic filler and the other components in the friction material may be unfavorable.

The friction material composition of the invention may be used as a friction member itself to form a friction surface, when a friction material is produced. Examples of the friction material produced with the friction material composition include (1) a structure consisting of the friction member, (2) a structure including a back metal and a friction member formed thereon and having a friction surface, wherein the friction member comprises the friction material composition of the invention, and (3) a structure including the structure (2), and a primer layer for surface modification to increase the effect of bonding to the back metal and/or an adhesive layer for adhesion between the back metal and the friction member, which is interposed between the back metal and the friction member.

Specifically, such friction materials may be used for disc brake pads, brake linings and the like for automobiles or the like, or the friction material composition of the invention may be subjected to the process of forming it into the desired shape, working, bonding, or the like and then used as a friction material for clutch facings, electromagnetic brakes, holding brakes, or the like.

The friction material may be produced by a general method from the friction material composition of the invention, and the friction material composition of the invention may be molded into the friction material. More specifically, for example, the friction material of the invention may be obtained by a process including uniformly mixing the friction material composition of the invention by means of a mixer such as a Lodige mixer, a pressure kneader or an Eirich mixer, preforming the mixture in a mold, molding the resulting preform under the conditions of a molding temperature of 130 to 160° C. and a molding pressure of 20 to 50 MPa for 2 to 10 minutes, and heat-treating the molded product at 150 to 250° C. for 2 to 10 hours. If necessary, coating, scorching, or polishing may be further performed.

The friction material composition of the invention has a high reinforcing effect and therefore may be used to mold an underlayer material of the friction material. The term "underlayer material" refers to a layer that is interposed between a back metal and a friction member to form the friction surface of a friction material so that the shearing strength between the friction member and the back metal can be increased.

When the friction material composition of the invention is used to form an underlayer material, examples of the friction material produced with the underlayer material include (1) a structure including a back metal, the underlayer material formed on the back metal, and a friction member having a friction surface and formed on the underlayer material, and (2) a structure including a back metal, the underlayer material, and a primer layer for surface modification to increase the effect of bonding to the back metal or an adhesive layer for adhesion between the back metal and the underlayer material, which is interposed between the back metal and the underlayer material.

When the friction material composition of the invention is used as an underlayer material, the friction material composition of the invention may also be molded into a friction member to form a friction surface.

The back metal, the primer layer, and the adhesive layer may be those generally used for friction materials.

The underlayer material made from the friction material composition of the invention has high shear strength to the object and therefore can increase the shearing strength between the friction member and the back metal. Since the friction member is worn away through use, the underlayer material should also have friction material performance like the friction member. In a preferred embodiment, therefore, the friction material composition of the invention is used to form the underlayer material for increasing the shear strength to the back metal.

For example, the underlayer material may be produced by the method described below with the friction material composition of the invention. Specifically, the underlayer material may be obtained by a process including uniformly mixing the friction material composition of the invention by means of a mixer such as a Lodige mixer, a pressure kneader or an Eirich mixer, preforming the mixture on the surface of a friction material to be a back metal side by means of a mold, molding the resulting preform under the conditions of a molding temperature of 130 to 160° C. and a molding pressure of 20 to 50 MPa for 2 to 10 minutes, and heat-treating the molded product at 150 to 250° C. for 2 to 10 hours.

Thereafter, an appropriate friction member may be formed on the underlayer material so that a friction material can be obtained. If necessary, the resulting friction material may be subjected to coating, scorching, or polishing.

EXAMPLES

The present invention is described in more detail by the examples below, which are not intended to limit the scope of the invention.

Examples 1 to 8 and Comparative Examples 1 to 6

Preparation of Disc Brake Pads

Friction material compositions were each obtained by blending materials according to each blend ratio showed in Tables 1 and 2. The friction material compositions were each mixed in a Lodige mixer (trade name: Lodige Mixer M20, manufactured by MATSUBO Corporation). Each mixture was preformed in a molding press (manufactured by Oji Kikai Kogyo K. K.). Each resulting preform was subjected to heating and compression molding with a molding press (manufactured by SANKI SEIKO CO., LTD.) under the conditions of a molding temperature of 145° C. and a molding pressure of 30 MPa for 6 minutes. Each molded product was heat-treated at 200° C. for 4.5 hours, polished with a rotary polishing machine and subjected to scorching at 500° C., so that each disc brake pad was obtained. In each example, the prepared disc brake pad had a friction material projected area of 51.7 cm$^2$.

Mineral fibers A: RB250 Roxul 1000 (manufactured by Lapinus Fibres) 125 μm in average fiber length Mineral fibers B: RB215 Roxul 1000 (manufactured by Lapinus Fibres) 150 μm in average fiber length Mineral fibers C: RB220 Roxul 1000 (manufactured by Lapinus Fibres) 230 μm in average fiber length Mineral fibers D: RB240 Roxul 1000 (manufactured by Lapinus Fibres) 300 μm in average fiber length Mineral fibers E: RB280 Roxul 1000 (manufactured by Lapinus Fibres) 650 μm in average fiber length (Measurement of Shear Strength)

The disc brake pad prepared in each of Examples 1 to 8 and Comparative Examples 1 to 5 was then evaluated for shear strength, namely breaking load, by the shear strength test method according to JIS D 4422. The results are also shown in Tables 1 and 2. The relationship between the shear strength and the average fiber length is shown in FIG. 1.

(Evaluation of Rotor Wear Amount (Opposite Material Aggressiveness) and Brake Pad Wear Amount (Wear Resistance))

The test according to JASO C406 (Test procedure of dynamometer for passenger car braking unit) was performed with a dynamo meter, and evaluations were made. The rotor wear amount and the pad wear amount were determined from the differences in disc rotor thickness and in brake pad thickness, respectively, between before and after the test according to JASO C406. The results are shown in Tables 1 and 2.

TABLE 1

| Compsition | | Manufacture | Trade Name | Example 1 | Example 2 | Example 3 | Example 4 | Example 5 | Example 6 | Example 7 | Example 8 |
|---|---|---|---|---|---|---|---|---|---|---|---|
| Fiber matrix | Phenol resin | Hitachi Chemical Co., Ltd. | HP491UP | 10 | 10 | 10 | 10 | 10 | 10 | 10 | 10 |
| Metal fiber | Brass fiber | Nikon Steel Wool Co., Ltd. | CBM208 | 10 | 10 | 10 | 10 | 10 | 10 | 10 | 10 |
| Organic fiber | Aramid fiber | DU PONT-TORAY Co., Ltd. | 1F538 | 2 | 2 | 2 | 2 | 2 | 2 | 2 | 2 |
| Inorganic filler | Barium sulfate | Canton Metal Corporation | Barite powder | 50 | 50 | 50 | 50 | 44 | 49 | 49 | 50 |
| | Calcium hydroxide | Chichibu Lime Industry | SA149 | 2 | 2 | 2 | 2 | 2 | 2 | 2 | 2 |
| Organic filler | Cashew dust | Cashew Co., Ltd. | H101 | 6 | 6 | 6 | 6 | 6 | 6 | 6 | 6 |
| | NBR powder | Dainippon Ink and Chemicals Incorporated | Nippol1411 | 6 | 6 | 6 | 6 | 6 | 6 | 6 | 6 |
| The content of mineral fiber (wt %) | Mineral fiber A | | | 7 | 7 | — | — | 10 | 5 | 5 | 10 |
| | Mineral fiber B | | | — | — | 7 | — | — | — | 5 | — |
| | Mineral fiber C | | | — | — | 7 | — | — | 5 | 5 | — |
| | Mineral fiber D | | | — | 7 | — | 7 | — | — | — | — |
| | Mineral fiber E | | | 7 | — | — | 7 | 10 | 5 | — | 4 |
| Difference of the Average fiber length (μm) | | | | 525 | 175 | 80 | 350 | 525 | 525 | 105 | 525 |
| Total average fiber length of the mineral fiber (μm) | | | | 390 | 212 | 190 | 475 | 390 | 335 | 235 | 275 |
| Shear strength (kN) | | | | 42.0 | 43.6 | 46.0 | 41.0 | 43.1 | 42.0 | 44.1 | 43.6 |
| Rotor wear amount (μm) | | | | 4 | 3 | 3 | 5 | 12 | 6 | 5 | 5 |
| Brake pad wear amount (μm) | | | | 0.40 | 0.43 | 0.38 | 0.42 | 0.58 | 0.50 | 0.45 | 0.46 |

The content: % by mass based on the total amount of the friction material composition

TABLE 2

| Compsition | | Manufacture | Trade Name | Comparative Example 1 | Comparative Example 2 | Comparative Example 3 | Comparative Example 4 | Comparative Example 5 | Comparative Example 6 |
|---|---|---|---|---|---|---|---|---|---|
| Fiber matrix | Phenol resin | Hitachi Chemical Co., Ltd. | HP491UP | 10 | 10 | 10 | 10 | 10 | 10 |
| Metal fiber | Brass fiber | Nihon Steel Wool Co., Ltd. | CBM208 | 10 | 10 | 10 | 10 | 10 | 10 |
| Organic fiber | Aramid fiber | DU PONT-TORAY Co., | 1F538 | 2 | 2 | 2 | 2 | 2 | 2 |
| Inorganic filler | Barium sulfate | Canton Metal Corporation | Barite powder | 50 | 50 | 50 | 50 | 44 | 50 |
| | Calcium hydroxide | Chichibu Lime Industry | SA149 | 2 | 2 | 2 | 2 | 2 | 2 |
| Organic filler | Cashew dust | Cashew Co., Ltd. | H101 | 6 | 6 | 6 | 6 | 6 | 6 |
| | NBR powder | Dainippon Ink and Chemicals Incorporated | Nippol1411 | 6 | 6 | 6 | 6 | 6 | 6 |

TABLE 2-continued

|  |  |  | Comparative Example 1 | Comparative Example 2 | Comparative Example 3 | Comparative Example 4 | Comparative Example 5 | Comparative Example 6 |
| --- | --- | --- | --- | --- | --- | --- | --- | --- |
| Compsition | Manufacture | Trade Name |  |  |  |  |  |  |
| The content of mineral fiber (wt %) | Mineral fiber A | | — | — | 14 | — | — | 7 |
| | Mineral fiber B | | — | — | — | 14 | — | 7 |
| | Mineral fiber C | | — | — | — | — | 14 | — |
| | Mineral fiber D | | — | 14 | — | — | — | — |
| | Mineral fiber E | | 14 | — | — | — | — | — |
| Difference of the average fiber length (μm) | | | none | none | none | none | none | 25 |
| Total average fiber length of the mineral fiber (μm) | | | 650 | 300 | 125 | 150 | 230 | 138 |
| Shear strength (kN) | | | 34.5 | 35.8 | 39.4 | 38.0 | 35.5 | 38.0 |
| Rotor wear amount (μm) | | | 4 | 5 | 4 | 4 | 5 | 4 |
| Brake pad wear amount (μm) | | | 0.40 | 0.42 | 0.42 | 0.42 | 0.43 | 0.47 |

The content: % by mass based on the total amount of the friction material composition Tables 1 and 2 and FIG. 1 show that each disc brake pad produced with the friction material composition of the invention has a higher shear strength to the object than the conventional product, although the blending amount of mineral fibers in the friction material composition of the invention is the same as that in the conventional composition.

INDUSTRIAL APPLICABILITY

According to the present invention, there can be provided a friction material composition in which mineral fibers provides an improved reinforcing effect as compared with conventional compositions so that it has high shear strength to the object. According to the invention, there can be also provided a friction material produced with such a friction material composition.

According to the present invention, there can be provided a friction material composition in which mineral fibers provides an improved reinforcing effect as compared with conventional compositions, although the blending amount of the mineral fibers in the composition is the same as that in the conventional compositions, so that it has high shear strength to the object. According to the invention, there can be also provided a friction material produced with such a friction material composition.

The invention claimed is:

1. A friction material composition, comprising a fiber matrix, a binder, an organic filler, and an inorganic filler, wherein
    the fiber matrix contains at least two types of mineral fibers different in average fiber length from each other, and
    the difference between the minimum value and the maximum value among the average fiber lengths of the mineral fibers is 50 μm or more.

2. The friction material composition according to claim 1, wherein the mineral fibers contain an Al element.

3. The friction material composition according to claim 1, wherein the mineral fibers have a total average fiber length of 500 μm or less.

4. The friction material composition according to claim 1, wherein the mineral fibers are bio-soluble mineral fibers.

5. The friction material composition according to claim 1, containing 5 to 25% by mass of the mineral fibers, based on the amount of the whole of the friction material composition.

6. The friction material composition according to claim 1, wherein the fiber matrix contains 5% by mass or more of nonferrous metal fibers and/or 1% by mass or more of fibrillated organic fibers other than the mineral fibers.

7. A friction material produced by molding the friction material composition according to claim 1.

8. A friction material, comprising a back metal, a friction member having a friction surface, and an underlayer material interposed between the back metal and the friction member and produced by molding the friction material composition according to claim 1.

* * * * *